United States Patent
Stüdemann et al.

(10) Patent No.: US 6,880,214 B2
(45) Date of Patent: Apr. 19, 2005

(54) COLUMN-TYPE MACHINE TOOL

(75) Inventors: Bernd Stüdemann, Rath-Anhoven (DE); Werner Jodl, Hückelhoven (DE)

(73) Assignee: DS Technologie Werkzeugmaschinenbau GmbH (DE)

( * ) Notice: Subject to any disclaimer, the term of this patent is extended or adjusted under 35 U.S.C. 154(b) by 0 days.

(21) Appl. No.: 10/398,889

(22) PCT Filed: Oct. 5, 2001

(86) PCT No.: PCT/EP01/11501

§ 371 (c)(1),
(2), (4) Date: Jul. 1, 2003

(87) PCT Pub. No.: WO02/30615

PCT Pub. Date: Apr. 18, 2002

(65) Prior Publication Data

US 2004/0045146 A1 Mar. 11, 2004

(30) Foreign Application Priority Data

Oct. 11, 2000 (DE) .......................... 100 50 141

(51) Int. Cl.[7] .............................................. B23Q 39/00
(52) U.S. Cl. ................. 29/27 C; 29/27 R; 29/DIG. 94; 409/137; 409/235; 409/134
(58) Field of Search .............................. 29/27 C, 27 R, 29/DIG. 94, 33 P, 563; 409/137, 235, 165, 134; 408/234

(56) References Cited

U.S. PATENT DOCUMENTS

| 2,864,269 A | | 12/1958 | Mottu |
| 3,750,245 A | | 8/1973 | Kennedy et al. |
| 3,825,245 A | * | 7/1974 | Osburn et al. ............... 29/33 P |
| 4,553,886 A | * | 11/1985 | Vasilchenko et al. ....... 409/233 |
| 4,604,008 A | * | 8/1986 | Bone ........................... 409/231 |
| 4,632,615 A | | 12/1986 | Yamamura |
| 4,638,550 A | * | 1/1987 | Malzkorn .................... 409/230 |
| 4,770,575 A | * | 9/1988 | Kolblin et al. .............. 409/230 |
| 4,936,174 A | | 6/1990 | Holy et al. |
| 5,033,174 A | * | 7/1991 | Zieve ........................... 29/34 B |
| 5,263,800 A | * | 11/1993 | Chen ........................... 409/137 |
| 5,624,363 A | * | 4/1997 | Kuriki ......................... 409/134 |

(Continued)

FOREIGN PATENT DOCUMENTS

| DE | 2852846 | | 7/1980 | |
| DE | 19605301 | | 8/1997 | |
| DE | 19645324 | | 5/1998 | |
| DE | 19739429 | | 3/1999 | |
| DE | 19849833 | | 3/2000 | |
| EP | 517168 A2 | * | 12/1992 | ............. B23C/1/02 |

(Continued)

OTHER PUBLICATIONS

German Patent Office Search Report dated Apr. 19, 2001.

*Primary Examiner*—Erica Cadugan
*Assistant Examiner*—Dana Ross
(74) *Attorney, Agent, or Firm*—Ostrolenk, Faber, Gerb & Soffen, LLP

(57) ABSTRACT

A column-type machining arrangement for machining a workpiece is provided, including a machine bed; a traversable column slidably coupled to the machine bed; a tool carrier coupled to the column, the tool carrier configured to detachably couple to a tool for machining the workpiece; a plurality of guideways to guide the traversable column on the machine bed, the guideways including a first guideway arranged on the machine bed below the column and a second guideway arranged centrally and laterally next to the column at a height equal to approximately half a height of the column; and a first drive arrangement configured to cause the column to slidably traverse on the machine bed, the first drive arrangement acting on the column at a level of the second guideway.

14 Claims, 2 Drawing Sheets

U.S. PATENT DOCUMENTS

| | | | | |
|---|---|---|---|---|
| 5,688,084 A | * | 11/1997 | Fritz et al. | 409/202 |
| 6,033,165 A | * | 3/2000 | Yamauchi | 409/134 |
| 6,220,799 B1 | * | 4/2001 | Okutani et al. | 29/26 A |
| 6,338,705 B1 | * | 1/2002 | Cavallo et al. | 29/26 A |
| 6,641,341 B1 | * | 11/2003 | Sato et al. | 409/137 |
| 6,758,117 B1 | * | 7/2004 | Baumann et al. | 29/36 |
| 6,761,515 B1 | * | 7/2004 | Laur et al. | 409/137 |

FOREIGN PATENT DOCUMENTS

| | | | | |
|---|---|---|---|---|
| EP | 900627 A2 | * | 3/1999 | B23Q/3/157 |
| FR | 1432740 | | 3/1966 | |
| FR | 2093333 | | 1/1972 | |
| JP | 01005710 A | * | 1/1989 | B23C/1/027 |
| JP | 04025333 A | * | 1/1992 | B23Q/1/00 |

* cited by examiner

_US 6,880,214 B2_

COLUMN-TYPE MACHINE TOOL

FIELD OF THE INVENTION

The invention relates to a column-type machine tool, for example, a milling center having a traversable column and a tool carrier arranged thereon.

BACKGROUND INFORMATION

Such a column-type machine tool is referred to in German Published Patent Application No. 196 45 324, having a machine bed, a column that is traversable on the machine bed on guideways and on which at least one cutting tool movable in several axes is arranged, a supporting structure with guideways for the top end of the column, and at least one traverse drive, interacting with the guideways of the machine bed and of the supporting structure, for the column.

If the machine tool has only one traverse drive, no sufficiently high accelerations may be achieved during the traverse of the column, since the traverse drive performs away from the center of gravity of the column and therefore produces a tilting moment during acceleration. Although this disadvantage may be avoided by synchronous traverse drives in the region of the bottom and the top guideway of the column, the outlay for the traverse drives may be doubled. The supporting structure may also be complicated, since it may have to be approximately just as high as the column, so that a guideway may be arranged in the region of the top end of the column.

These problems may also occur in the column-type machine tool referred to in German Published Patent Application No. 28 52 846, the column of which is guided solely in guideways in the base region on the machine bed.

SUMMARY OF THE INVENTION

It is an object of the present invention to provide a column-type machine tool which, in a simple construction and with the lowest possible masses to be moved, ensures, or at least makes more probable, an accurate guidance at high accelerations and decelerations to thereby increase the stock-removing capacity and the machining accuracy. It is also an object of the present invention to improve chip disposal.

In the case of a column-type machine tool of the type mentioned above, an exemplary embodiment of the present invention provides for a guideway to be arranged below the column on the machine bed, that a further guideway be arranged laterally next to the column, approximately centrally at half the height of the column and approximately at the level of the center of gravity of the column, and that a traverse drive act on the column at the level of the lateral guideway without a substantial tilting moment acting on the column.

Since the guideway arranged laterally next to the column approximately at half the height of the column lies approximately at the level of the center of gravity of the column, no tilting moment acts on the column by the traverse drive during acceleration and deceleration, and therefore the column does not tilt on the guideways. Thus, with only one traverse drive, high acceleration and deceleration rates may be achieved without providing a second traverse drive, with the complications associated therewith.

Even if a perpendicularly traversable tool carrier is arranged on the column, the aforesaid advantages are retained, even when the tool carrier is located in its lowermost or topmost position on the column, since the mass of the tool carrier may be kept small in relation to the column and the maximum distance from the center of gravity may, at most, be only equal to half the column height.

The tool carrier may be a universal tool carrier for mounting a turning tool, for example, in a tool slide traversable parallel to the guideways, or as a headstock with horizontal work spindle arranged thereon and, for example, running parallel to the guideways of the column.

The work spindle may be arranged so as to be axially traversable in the tool carrier.

A work table that is traversable on guideways transversely to the guideways of the column and may, for example, be rotatable, may be arranged in front of the column, so that the work table may perform a feed movement in the X-axis, the tool carrier may perform a feed movement in the Y-axis and the column may perform a feed movement in the Z-axis.

According to the present invention, the chip disposal may be improved, since covers may be arranged in the region of the guideways on the machine bed extending at an angle of 45°. These covers operate to direct chips thrown against them into a chip trough below the tool carrier, the chips being removed therefrom, for example, by a chip conveyor.

Roof-shaped telescopic covers may be arranged over the guideways adjacent to the column for the work table, and sloping telescopic covers, through which the chips may be directed into chip troughs arranged on both sides of the roof-shaped telescopic cover, may be arranged over the guideways remote from the column for the work table.

The chips may be removed from these chip troughs by chip conveyors, in the course of which the chip conveyor in the chip trough at the column conveys into the chip trough adjacent to the roof-shaped telescopic covers.

DETAILED DESCRIPTION

Figure 1:
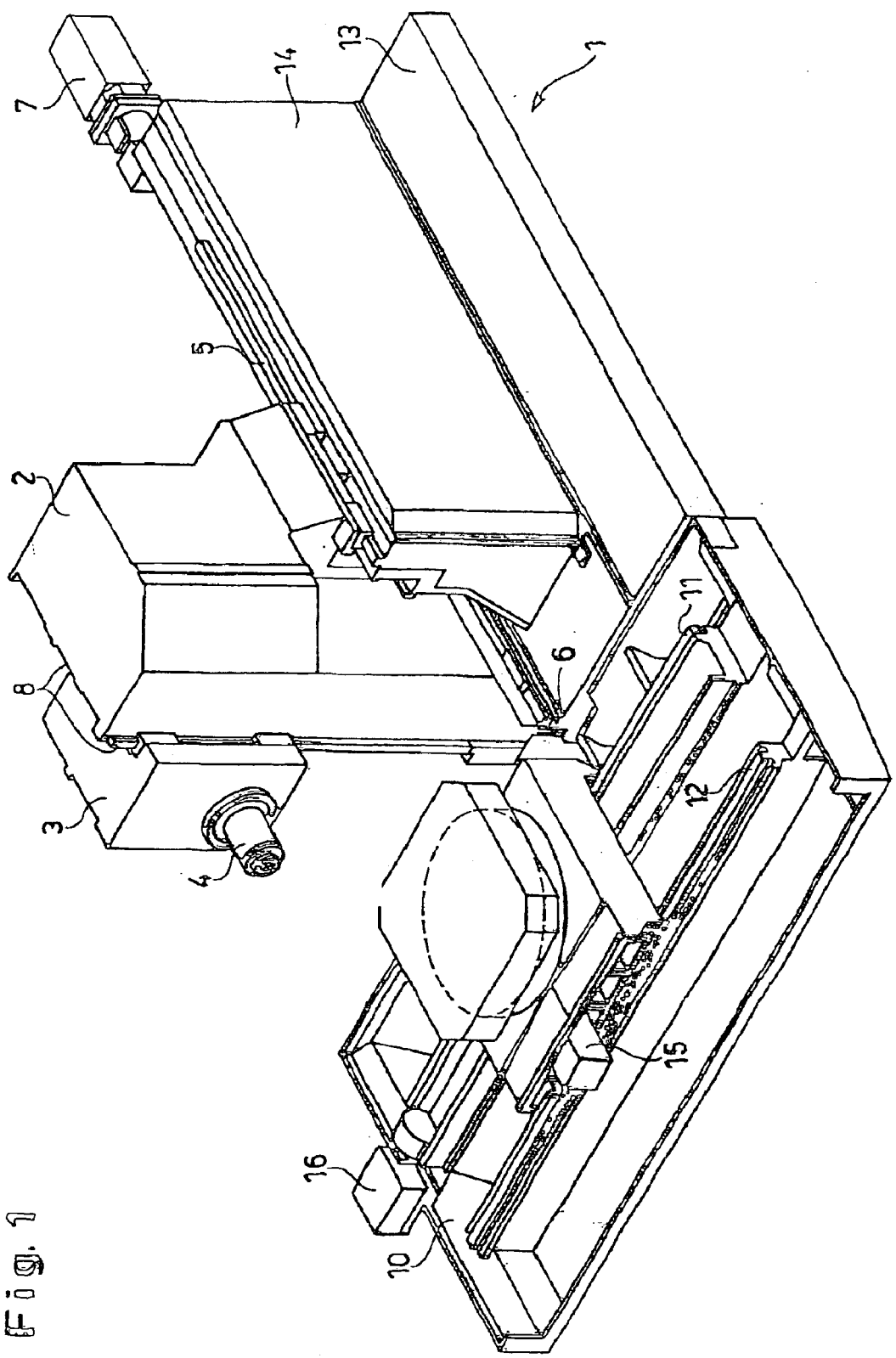
FIG. 1 is a perspective view of a column-type machine tool with removed covers according to the invention.

A machine bed 1 includes a horizontal base plate 13 and an approximately perpendicular plate 14 arranged thereon and forming a supporting structure.

A column 2 is guided by means of a guideway 6 on an edge of the base plate 13 and approximately at half the height by means of a guideway 5 on the top edge of the perpendicular plate 14. The bottom guideway 6 is arranged below the column 2 approximately in its perpendicular center-of-gravity plane, whereas the top, lateral guideway 5 lies approximately at half the height of the column 2.

On the column 2, a tool carrier 3 is perpendicularly traversable on guideways 8 by a traverse drive 17. In this exemplary embodiment, the tool carrier 3 includes a headstock and carries a work spindle 4, which may, for example, be arranged to be axially traversable in the tool carrier 3.

The work spindle 4 may be designed for mounting milling cutters or angular milling heads. Likewise, a face plate may be attached to the work spindle 4. The work spindle 4 may also be a tool slide for mounting a turning tool if a workpiece is to be machined on the rotary table 9 arranged in front of it in the manner of a vertical lathe.

A traverse drive 7 engages on the column 2 at the level of the top guideway 5, so that high acceleration and deceleration rates may be achieved without a substantial tilting moment acting on the column.

Via guideways 11, 12, the rotary table 9 is traversable on a bed 10 transversely to the direction of movement of the column 2. A traverse drive 16 is provided for this purpose. A rotary drive 15 serves to rotate the rotary table 9, either for the angular positioning of a workpiece on the rotary table 9 or as a rotary drive for the rotary table 9 if a workpiece arranged thereon is to be machined in a rotary manner by a turning tool.

Figure 2:
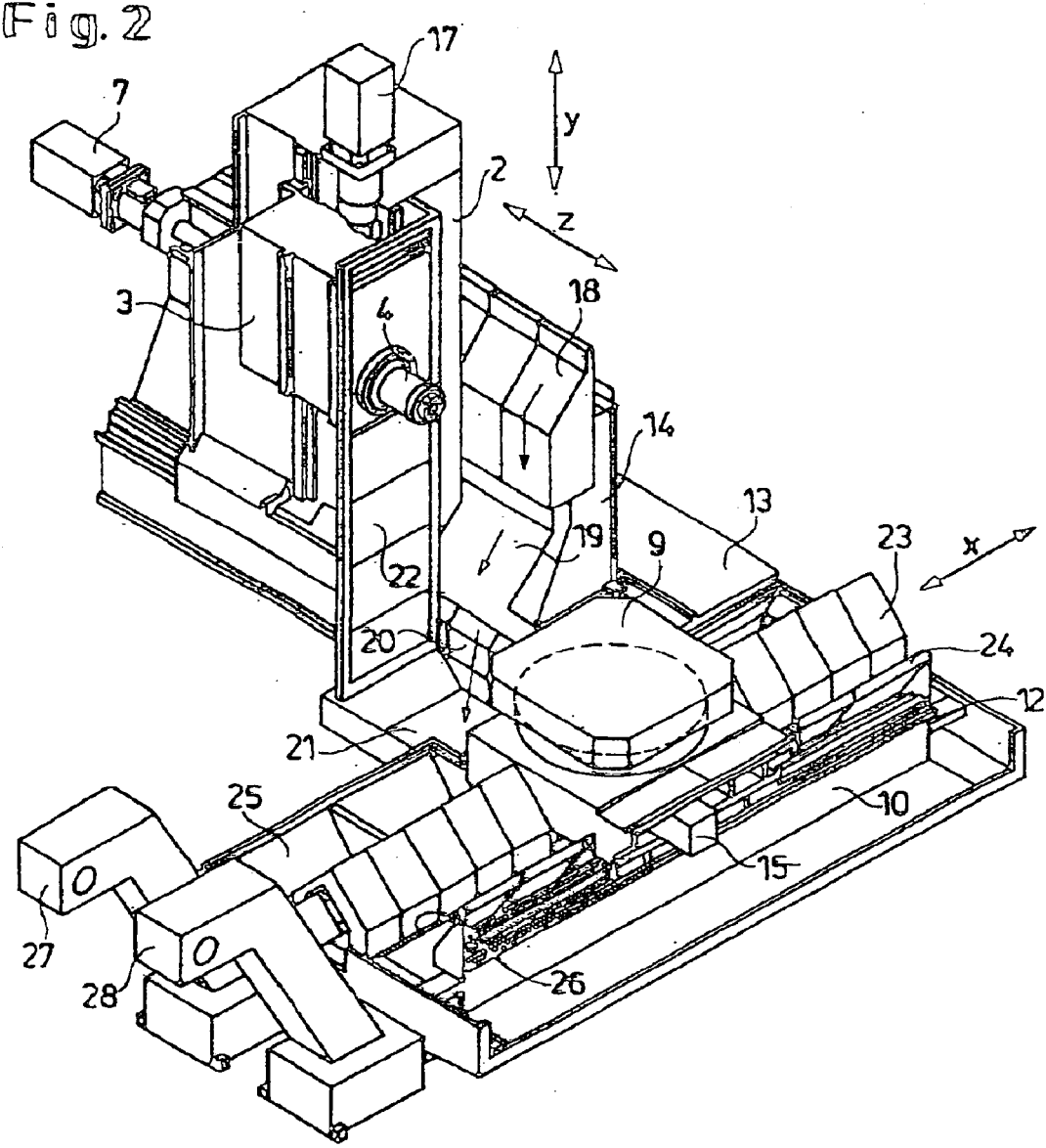
FIG. 2 is a perspective view of a column-type machine tool with covers arranged on the guideways according to the invention.

A top, sloping telescopic cover 18 for the top guideway 5, a sloping, fixed cover plate 19 and a bottom, sloping telescopic cover 20 for the bottom guideway 6 is shown in FIG. 2. Chips thrown against the covers 18, 19, 20 during the machining of a workpiece are directed into a chip trough 21 below a tool carrier. A flat telescopic cover 20 protects the guideways 8 on the column 2 from contamination by chips.

Roof-shaped telescopic covers 23 are arranged over the guideway 11 for the rotary table 9 on both sides of the latter, whereas sloping telescopic covers 24 are sufficient for the guideway 12.

A chip trough 25 is formed on that side of the roof-shaped telescopic covers 23, which faces the column 2, whereas a further chip trough 26 is formed between the roof-shaped telescopic covers 23 and the sloping telescopic covers 24. The chips in these chip troughs 25, 26 are removed by chip conveyors 27, 28. The chips in the chip trough 21 are transported into the chip trough 25, for example, by a chip conveyor (not shown) and are removed therefrom by the chip conveyor 27.

What is claimed is:

1. A column-type machining arrangement for machining a workpiece, comprising:
    a machine bed;
    a traversable column slidably coupled to the machine bed;
    a tool carrier coupled to the column, the tool carrier configured to detachably couple to a tool for machining the workpiece;
    a plurality of guideways to guide the traversable column on the machine bed, the guideways including a first guideway arranged on the machine bed below the column and a second guideway arranged centrally and laterally next to the column at a height equal to approximately half a height of the column; and
    a first drive arrangement configured to cause the column to slidably traverse on the machine bed, the first drive arrangement acting on the column at a level of the second guideway;
    wherein the machine bed includes a horizontal first plate and a second plate arranged approximately perpendicular to the first plate, the first guideway extending along a lateral edge of the horizontal plate, the second guideway being arranged on a top edge of the second plate.

2. The column-type machining arrangement according to claim 1, wherein the tool carrier is traversable on the traversable column along a direction that is perpendicular to the machine bed.

3. The column-type machining arrangement according to claim 2, wherein the tool is a turning tool.

4. The column-type machining arrangement according to claim 1, wherein the tool carrier is a headstock.

5. The column-type machining arrangement according to claim 4, wherein the headstock includes a horizontal work spindle configured to detachably couple to the tool.

6. The column-type machining arrangement according to claim 5, wherein the work spindle includes an axis extending parallel to the guideways.

7. The column-type machining arrangement according to claim 5, wherein the work spindle is axially traversable.

8. The column-type machining arrangement according to claim 1, further comprising:
    a table slidably coupled to the machine bed, the table being slidable in a direction perpendicular to the traversable column;
    a plurality of table guideways to guide the traversable table; and
    a second drive arrangement configured to cause the traversable table to slidably traverse on the machine bed.

9. The column-type machining arrangement according to claim 8, wherein the table is rotatable.

10. The column-type machining arrangement according to claim 8, wherein the table guideways include a first table guideway and a second table guideway, the column-type machining arrangement further comprising:
    a plurality of chip troughs;
    roof-shaped telescopic covers arranged over the first table guideway and adjacent to the traversable column;
    sloping telescopic covers arranged over the second table guideway and remote from the traversable column;
    at least one chip trough arranged between the roof-shaped telescopic covers and the sloping telescopic covers, the telescopic covers configured to direct chips into the chip trough;
    a plurality of chip conveyors arranged adjacent to the roof-shaped telescopic covers to remove the chips from the chip trough.

11. The column-type machining arrangement according to claim 10, further comprising:
    a plurality of sloping covers arranged in a region of the first and second guideways, the sloping covers sloping at an angle of at least 45 degrees;
    a chip container arranged below the tool carrier; and
    a chip container conveyor arranged in the chip container; wherein the sloping covers are configured to direct the chips into the chip container, and the chip container conveyor is configured to transport at least some of the chips from the chip container into at least one of the plurality of chip troughs.

12. The column-type machining arrangement according to claim 1, further comprising:
    a plurality of covers arranged in a region of the first and second guideways, the covers sloping at an angle of at least 45 degrees;
    a chip trough arranged below the tool carrier; and
    a chip conveyor arranged in the chip trough to transport chips from the chip trough; wherein the covers are configured to direct the chips into the chip trough.

13. The column-type machining arrangement according to claim 1, wherein the column-type machining arrangement forms a milling center.

14. A column-type machining arrangement for machining a workpiece, comprising:
    a machine bed;
    a traversable column slidably coupled to the machine bed;
    a tool carrier coupled to the column, the tool carrier configured to detachably couple to a tool for machining the workpiece;
    a plurality of guideways to guide the traversable column on the machine bed, the guideways including a first guideway arranged on the machine bed below the column and a second guideway arranged centrally and laterally next to the column at a height equal to approximately half a height of the column; and a first drive arrangement configured to cause the column to slidably traverse on the machine bed, the first drive arrangement acting on the column at a level of the second guideway; wherein the tool carrier is traversable on the traversable column along a direction that is perpendicular to the machine bead, the tool is a turning tool, and the tool carrier includes a tool slide to mount the turning tool, the tool slide being configured to be traversed parallel to the guideways.

* * * * *